(12) United States Patent
Schieve

(10) Patent No.: US 10,534,881 B2
(45) Date of Patent: Jan. 14, 2020

(54) METHOD OF DEBUGGING A PROCESSOR

(71) Applicant: Advanced Micro Devices, Inc., Santa Clara, CA (US)

(72) Inventor: Eric W. Schieve, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 92 days.

(21) Appl. No.: 15/950,147

(22) Filed: Apr. 10, 2018

(65) Prior Publication Data

US 2019/0311072 A1 Oct. 10, 2019

(51) Int. Cl.
*G06F 17/50* (2006.01)
(52) U.S. Cl.
CPC ........ *G06F 17/504* (2013.01); *G06F 17/5045* (2013.01)
(58) Field of Classification Search
USPC ...................................................... 716/102
See application file for complete search history.

(56) References Cited

U.S. PATENT DOCUMENTS

| | | | |
|---|---|---|---|
| 2005/0125754 A1 | 6/2005 | Schubert et al. | |
| 2005/0154550 A1* | 7/2005 | Singh | G01R 31/3183 702/108 |
| 2007/0011522 A1 | 1/2007 | Denniston | |
| 2008/0072025 A1* | 3/2008 | Staszewski | G06F 9/30032 712/241 |
| 2013/0132932 A1 | 5/2013 | Van Rozen | |
| 2015/0324327 A1* | 11/2015 | Chen | G06F 17/18 702/181 |
| 2016/0246599 A1 | 8/2016 | Johnson | |

FOREIGN PATENT DOCUMENTS

KR 10-2003-0058130 A 7/2003

OTHER PUBLICATIONS

Psarakis, M. et al., "Microprocessor Software-Based Self-Testing", IEEE Design & Test of Computers, vol. 27, Issue 3, pp. 4-19, May-Jun. 2010, USA.
Hakim, N., "Introduction to Post-Silicon Validation", Intel Corporation, Platform Validation Engineering, 32 pages, Oct. 29, 2010.

* cited by examiner

*Primary Examiner* — Mohammed Alam
(74) *Attorney, Agent, or Firm* — Volpe and Koenig, P.C.

(57) ABSTRACT

Methods for designing a processor based on executing a randomly created and randomly executed executable on a fabricated processor. By implementing randomization at multiple levels in the testing of the processor, coupled with highly specific test generation constraint rules, highly focused tests on a micro-architectural feature are implemented while at the same time applying a high degree of random permutation in the way it stresses that specific feature. This allows for the detection and diagnosis of errors and bugs in the processor that elude traditional testing methods. Once the errors and bugs are detected and diagnosed, the processor can then be redesigned to no longer produce the anomalies. By eliminating the errors and bugs in the processor, a processor with improved computational efficiency and reliability can be fabricated.

20 Claims, 7 Drawing Sheets

METHOD OF DEBUGGING A PROCESSOR

BACKGROUND

The testing of a processor is a time consuming and expensive process. Traditional testing of processor designs involves two types of testing: pre-silicon verification and post-silicon validation.

Pre-silicon verification involves running a simulation of the processor in a virtual environment to detect anomalies in the design. Often pseudo-random test generation is used to generate sequences of transactions at periodic intervals to re-create real-life traffic scenarios that the processor is likely to encounter. These pseudo-random tests may provide randomized coverage of the ISA (Industry Set Architecture) instruction set as well as processor modes, virtualization, privilege rings, system management and exceptions. However, pre-silicon verification tools do not provide the combination of sharp focus and intense permutation necessary to target specific internal features of the processor core. Instead, these tools use a massive number of random cycles while using internal coverage tools to tell when most of the internal nodes have been touched by the stimulus. Not only is this process incredibly slow, it is fundamentally limited by the rigid timing behavior of the virtual test environment.

Post-silicon validation involves operating the fabricated processor chips in actual application environments to validate correct behaviors over specified operating conditions. The objective of validation is to ensure that the product provides a targeted level of customer experience in terms of performance and function. Bug finding is not its primary goal. However, validation is limited in its ability to find bugs by the fact that actual application environments operate in repetitive and predictable ways. Diagnostic applications and random exercisers are sometimes used as a part of the validation process but these have significant liabilities. Diagnostics and exercisers are limited in their effectiveness by their need to perform data integrity self-checking as a pass/fail metric. This puts a tremendously restrictive burden of rules on how tests can function in a multi-processing environment. As a result, these data coherency and sharing rules limit the permutation space that is critical for finding functional bugs in the design.

Bugs and errors in the design of the processor cause undesirable behaviors in the computer in which they are installed. For example, a bug in the processor may result in a deadlock, exceptions, stalls and data integrity failures. When a deadlock occurs in a computer utilizing the processor, the computer must be restarted, and all of the user's unsaved data is likely lost. When a bug-induced exception occurs, it may result in immediate termination of the user's application or a crash of the operating system, both of which are likely to result in a loss of data and a loss of service of the computer. Similarly, when other bug-induced exceptions and stalls occur, the computer is slowed down as additional computer resources are required to address the faults. In addition, data integrity failures may allow incorrect data to be written to a user's files or database. This may pose a security vulnerability of the computer as the data integrity failure may be exploited to access secure data on the computer.

There exists a need for a method of efficiently identifying bugs resident in a fabricated processor that is not limited by the restrictions found in the prior art. As a result of identifying the bugs in the fabricated processor, the design of the processor can then be improved to no longer produce the identified bugs and therefore improve the operation of the computer in which the processor is installed.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1:
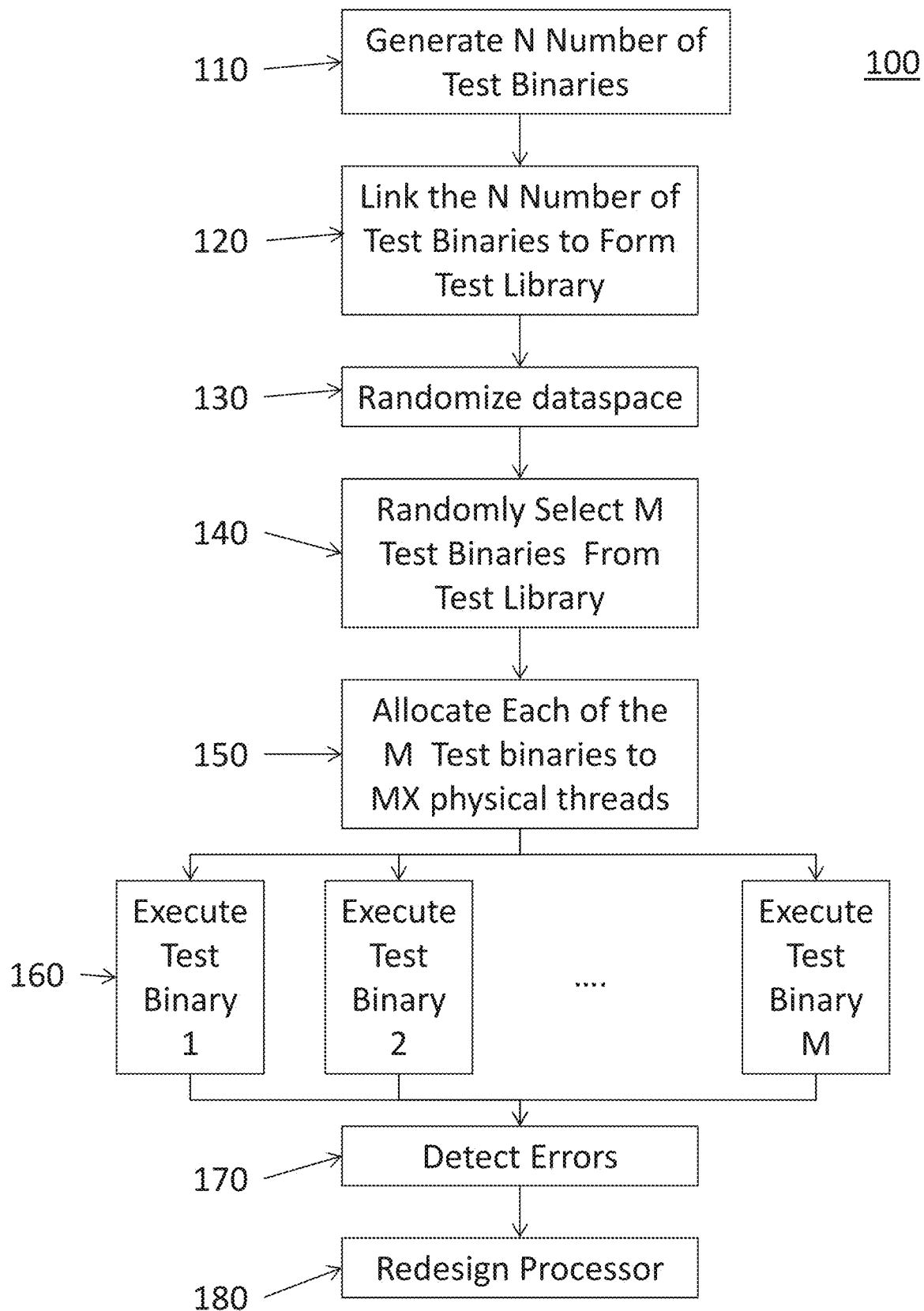
FIG. 1 is a flow diagram of the processor redesign process in accordance with certain implementations.

Example embodiments of the debugging method include receiving an input of a template file with a plurality of test types. Then, for each of the plurality of test types, a number of randomized subtests based on each respective template file are generated and compiled to form a test binary. The test binaries for each test type are then linked to form a test library. A subset of the test binaries is then randomly selected from the test library. Test binaries within the subset of test binaries are then randomly executed on physical threads according to a control data structure that is associated with each test binary. Bugs and errors are then detected in the random execution of the test binaries. The processor is then redesigned based on the errors and bugs detected.

Implementations of the present disclosed embodiments diagnose errors in a processor micro-architecture by executing a randomly created and randomly executed executable on a fabricated processor. By implementing randomization at multiple levels in the testing of the processor, coupled with highly specific test generation constraint rules, implementations of the disclosed embodiments are able to implement highly focused tests on a micro-architectural feature while at the same time applying a high degree of random permutation in the way it stresses that specific feature. This allows for the detection and diagnosis of errors and bugs in the processor that elude traditional testing methods. Once the errors and bugs are detected and diagnosed, the processor can be redesigned to no longer produce the anomalies. By eliminating the errors and bugs in the processor, a processor with improved computational efficiency and reliability can be fabricated.

Another benefit from the high degree of focus provided by the disclosed embodiments is that in a real-world processor debug environment, there may exist a number of very pervasive bugs that have not yet been fixed. In these conditions, standard validation techniques are rendered useless for finding additional new bugs as they repeatedly stumble across the known existing ones. Therefore, many implementations of the disclosed embodiments can be easily tuned to bypass (i.e., not stimulate known bug conditions) by focusing tightly on microarchitectural structures, which allows further in-depth testing to be performed. The ability to tightly focus on microarchitectural functionality allows the testing to be "tuned" and adapted based on learnings developed during the debug process.

The disclosed embodiments enable and encourage software behaviors that are entirely unorthodox as compared to that of applications and diagnostic software. In this manner, the disclosed embodiments easily apply stress to corner case areas of the processor microarchitecture that may harbor bugs that cannot be found using the prior art.

By executing a multistage random testing process, the disclosed embodiments are able to overcome the short comings of the prior art, which results in a processor that is more reliable and has greater computational efficiency.

Figure 2:
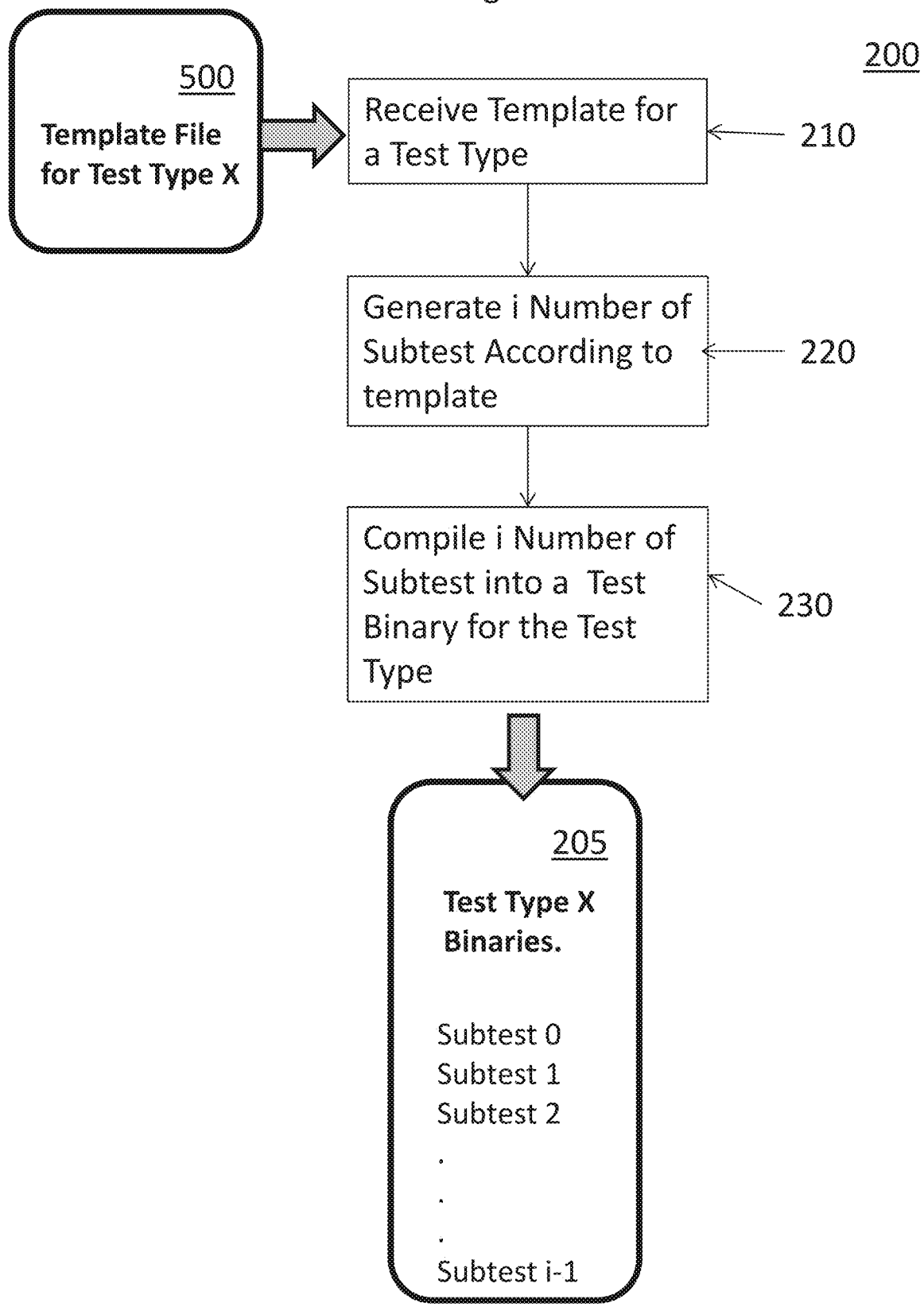
FIG. 2 is a flow diagram of the random subtest generating process for a test type in accordance with certain implementations.
Figure 3:
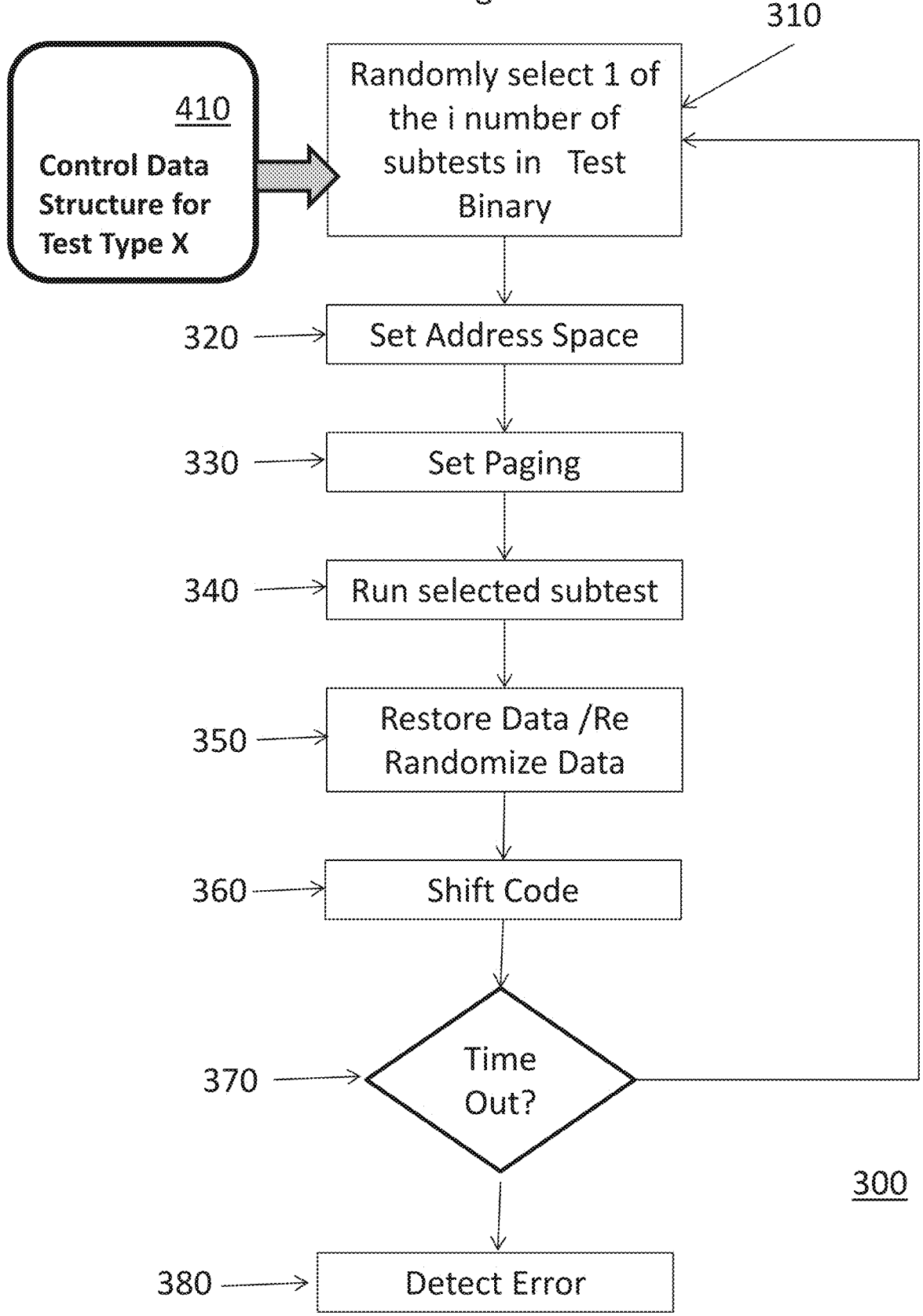
FIG. 3 is a flow diagram of the random runtime execution process in accordance with certain implementations.
Figure 4:
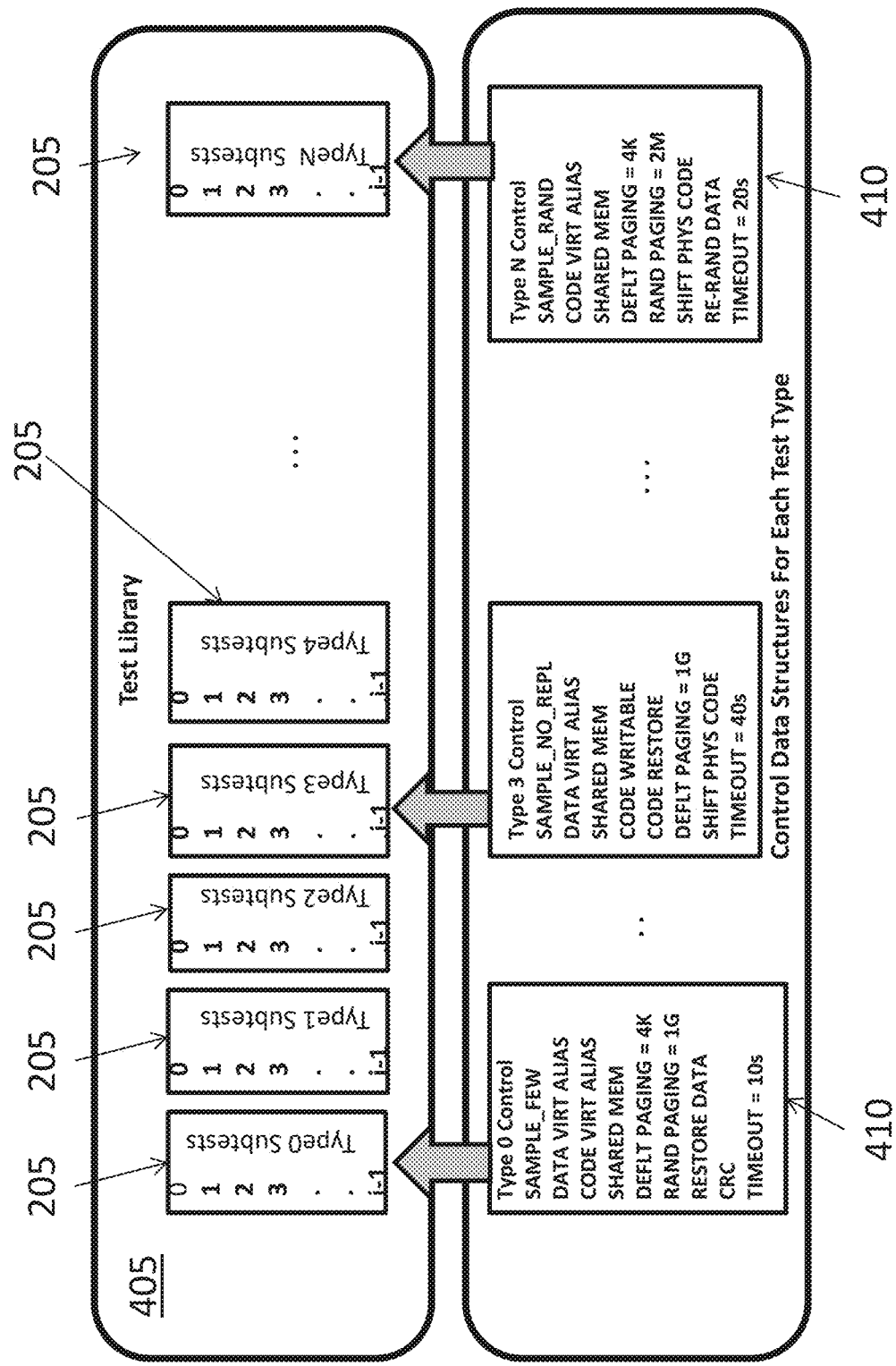
FIG. 4 is a graphical representation of the relationship between the test library and the Control Data Structure in accordance with certain implementations.

FIG. 1 is a flow diagram of a processor redesign process 100 in accordance with certain implementations and discussed with reference to FIGS. 2-6. A predetermined number, N, of test binaries 205 (as shown in FIG. 2) are randomly generated according to a random subtest generating process 200 for each test type (step 110). In many implementations, the number N is configured to provide the degree of code permutation that is appropriate for the microarchitecture being tested. For example, fewer subtests (values of N between 8-16) are often desirable in a pre-silicon emulation environment where test execution time is an issue. In a post-silicon environment, where execution time is not an issue, the number N is in the hundreds. Then, the predetermined number of test binaries 205 are linked together to form a test library 405 as shown in FIG. 4 (step 120).

Figure 6:
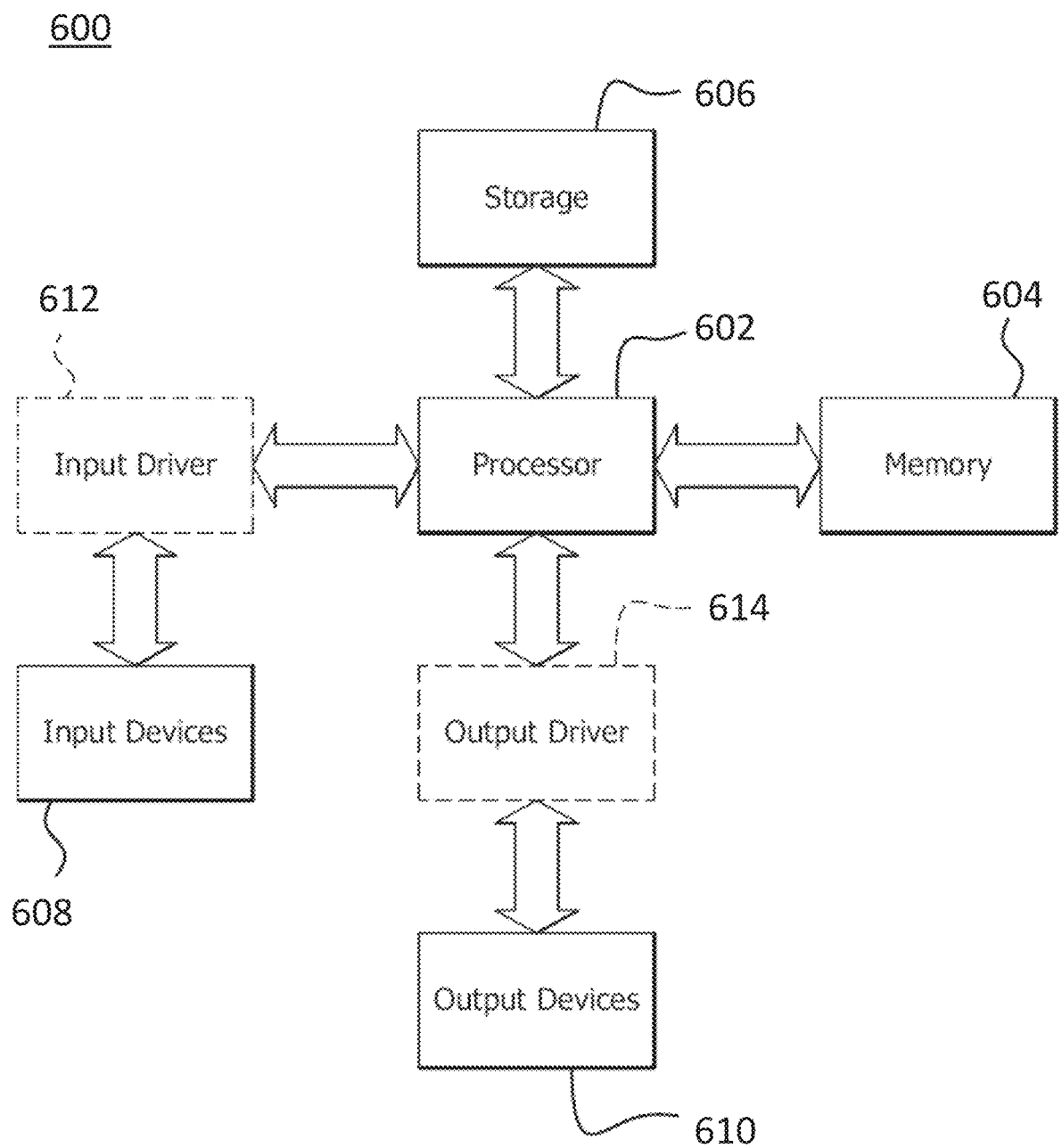
FIG. 6 is a block diagram of a computer that may utilize the processor to perform the debugging of the processor in accordance with certain implementations.

The dataspace of a processor 602 (as shown in FIG. 6) is then randomized by the runtime executive (step 130). The runtime executive then randomly selects M number of the test binaries 205 from the test library 405 (step 140). The value of M is determined by the 'pick' permutation control specified for a given test type and implemented by the runtime executive. Pick controls include such algorithms as sample with replacement, sample with no replacement, sampling a subset of subtests less than the number of threads, or sampling a single subtest to run on all threads. The type of picking chosen depends on the purpose of the test and the microarchitecture being tested. For example, a cross modifying code (CMC) test would want to pick the same subtest to run on all cores and threads. Then each of the M test binaries 205 are allocated to MX number of physical threads according to the pick algorithm (step 150). Each of the test binaries 205 are then executed on its respective physical thread according to random runtime execution process 300 as shown in FIG. 3 (step 160). The MX physical threads are then executed and monitored by the runtime executive until errors (e.g., exceptions, stalls, data integrity failures) are detected on one or more threads (step 170). Based on the detected errors, the processor 602 is redesigned to no longer produce the detected errors (step 180).

Figure 5A:
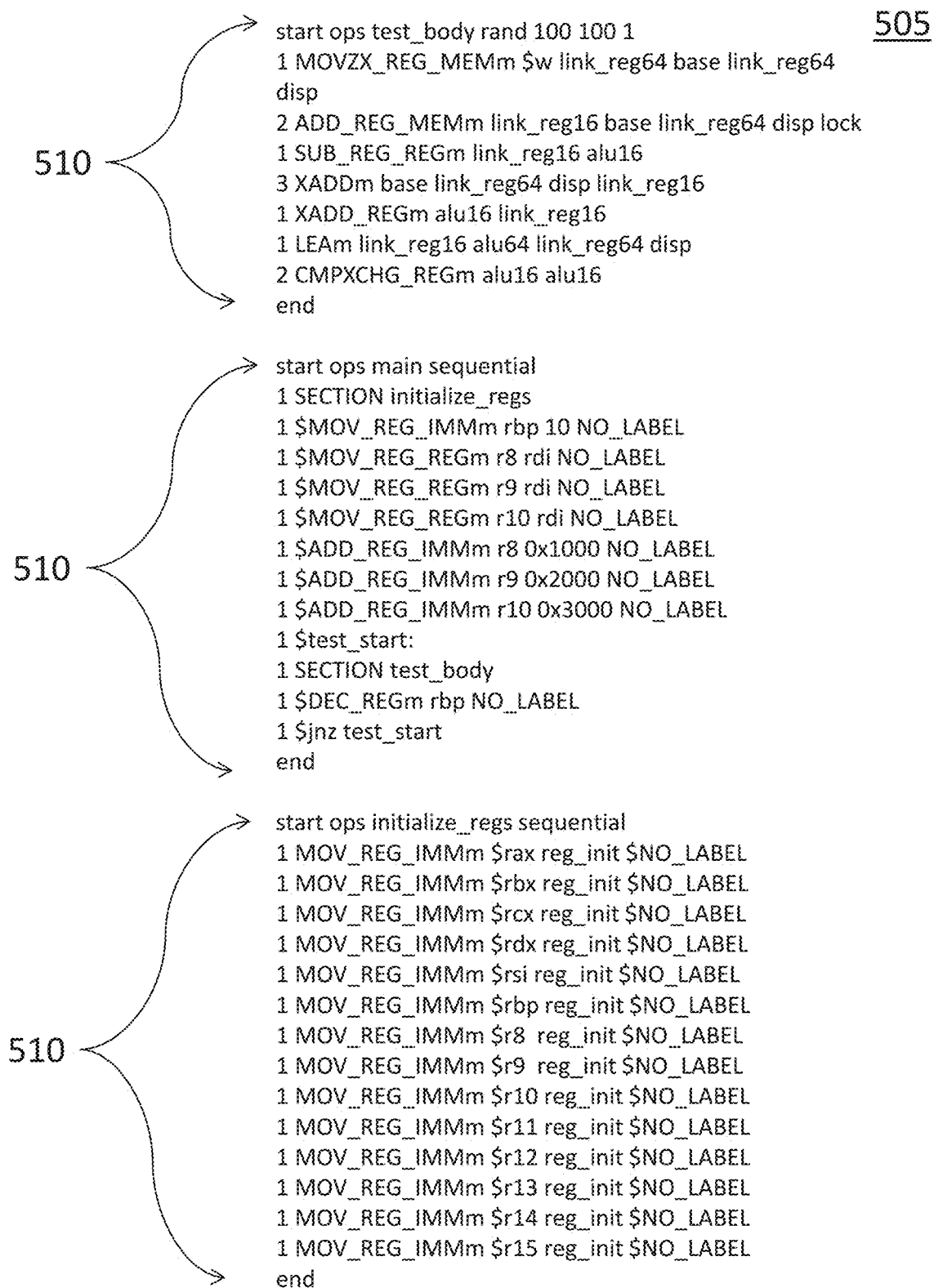
FIG. 5A shows a portion of an example template file in accordance with certain implementations.
Figure 5B:
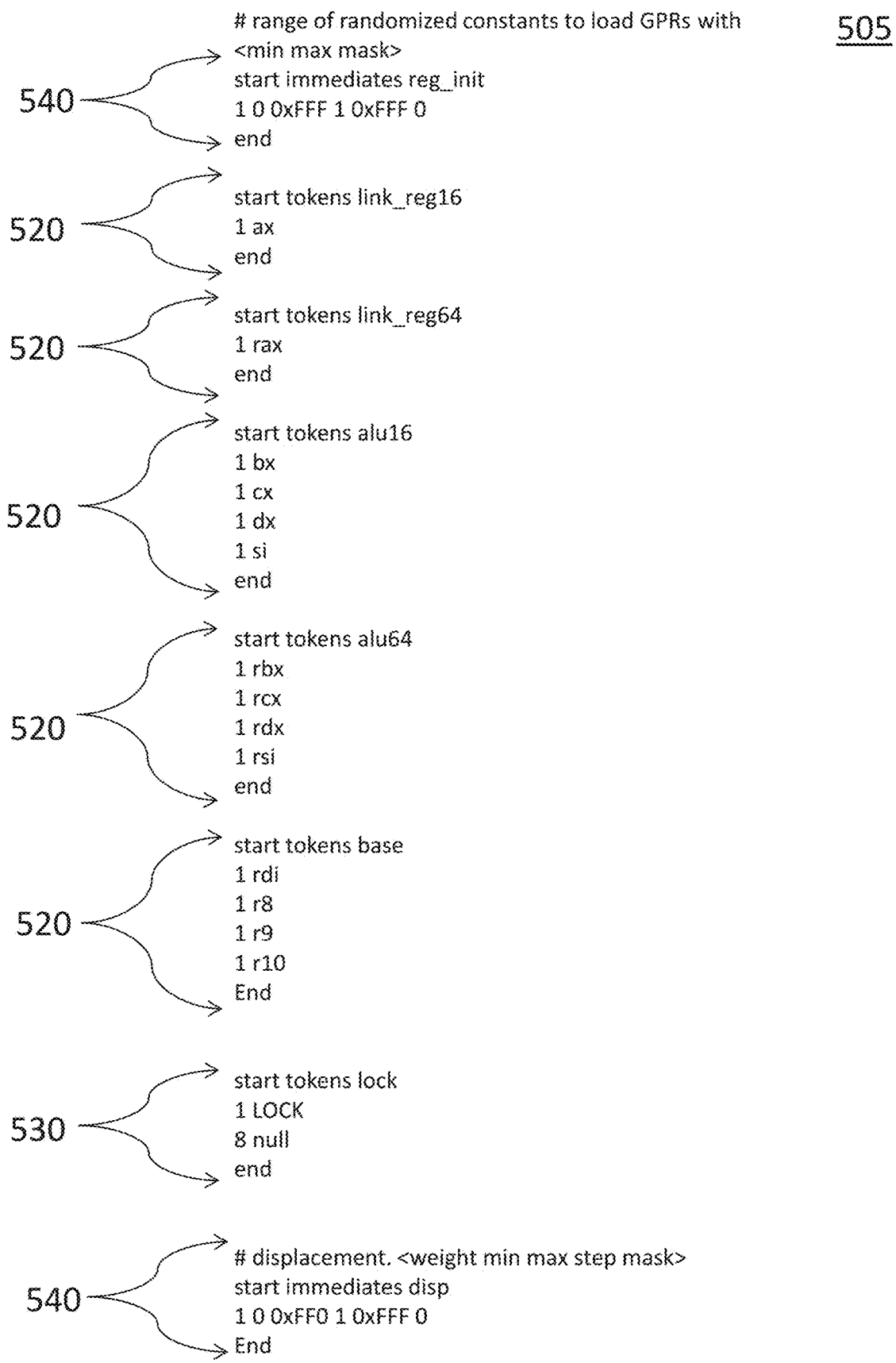
FIG. 5B shows a portion of an example template file in accordance with certain implementations.

The processor redesign process 100 is often iteratively repeated to remove additional errors. In many implementations, the redesign process (step 180) includes a combination of laboratory and simulation investigations. The investigations are performed to characterize the behavioral nature of the bug and deductively reduce the set size of contributory factors. This bounds the nature and scope of the bug and helps narrow down the design components that are potentially at fault. The results of these investigations are then to be utilized to generate a template file 500 (as shown in FIGS. 5A and 5B) that is utilized to create the test binaries 205 used in subsequent iterations. The results of these investigations are then to be utilized to generate the template file 500 for new test binaries that incorporate technical learnings derived from the investigations for subsequent iterations through the processor redesign process 100.

In laboratory investigations, a variety of on-chip debug tools (such as tools implementing the IEEE 1500 and P1687 standards) are used. Examples of specific tools are taught in Instrumentation Design and Debug for Systems on Chip by Stollon (Stolion, Neal. On-Chip Instrumentation Design and Debug for Systems on Chip. Springer US, 2011.), which is hereby incorporated by reference. For example, a deadlock can be analyzed using scan tools to dump the state of most internal flops at the point of failure. Exceptions and livelocks can be probed using microcoded monitor tools controlled externally via something like a Joint Test Action Group (JTAG) bus. With such tools, memory and internal processor structures (e.g., L1/L2 cache, branch predictors and pipelines Translation lookaside buffers (TLBs)) can be probed and register contents viewed. Bugs that have been determined to occur long upstream of the point of failure are often analyzed using internal signal trace capture tools.

Hypotheses of the root causes of the bugs are then tested through simulation. Then, based on the results of the simulation testing, new gate models of the processor are developed to eliminate the bugs.

Once the bugs have been completely removed, the new gate models of the processor are manufactured to create a new 'spin' of silicon for the new fixed revision of the processor 602. The new fixed revision of the processor 602 is then tested using the processor redesign process 100. As a result, the processor redesign process 100 is able to identify difficult to find bugs before they get into the field (production) and can also shorten the expensive debug time between bug identification and root cause.

FIG. 2 depicts an embodiment of the random subtest generating process 200 for a particular test type in accordance with certain implementations. The template file 500 for the particular test type is received (step 210). In some implementations, an optional seed for the randomization is also received. The template file 500 is then parsed, and a single assembly language source file is generated according to the rules specified in the template (step 220). Step 220 is repeated for each of the i number of subtests to be generated.

For example, in template file 505, test_body is defined as 'rand 100 100 1'. This causes the parser to randomly grab (according to the weighting factors) exactly 100 instructions from the test_body block. In addition, when the parser encounters a macro-like operation (i.e., ADD_REG_MEMm followed by a list of names like 'link_reg16', 'base', 'disp', 'lock' etc.), the parser uses it to look up the instantiated object and randomly select a value from it as defined by the constraints and rules of that object. These can either be integers (immediates class) or strings (tokens class). This is how X86 instructions are built. A type of instruction macro is picked from the Operations (OPS) Blocks 510 and then the key names associated with it are used to select the parameters for that macro, such as source and destination register names, immediate values (integer constants), lock prefixes and a special control used to create or inhibit a label from being automatically assigned to the instruction. Although X86 instructions are shown in the example, the same techniques can be generalized to other processor architectures (e.g., X64, ARM or ARM 64).

For example, to adapt the processor redesign process 100 for the ARM architecture would require adapting the template file 500 for the new architecture's instruction set. This would result in predetermined test binaries 205 that are targeted to the unique features of the new processor's microarchitecture. As a result, the processor redesign process 100 operates in the same manner and provides the same value as a debug tool as it would in the X86 environment.

The compiler then receives each of the i number of assembly language source files that behave according to the rules specified in the template file 500 (step 230). The compiler then groups the i number of assembly source files together to form a predetermined test binary 205. The predetermined test binary 205 includes i number of subtests that are individually executed.

The random subtest generating process 200 is repeated for each of the N test types. Therefore, N number of predetermined test binaries 205 are randomized and generated according to the rules specified in each respective template. For example, in certain implementations, each of the N predetermined test binaries 205 are generated to each test a specific microarchitectural feature. As a result, when the N predetermined test binaries are executed at run time, defects in specific features in the microarchitecture can be detected.

For example, in certain implementations, each of the N predetermined test binaries 205 individually target a specific feature of the microarchitecture across the length of the processor's pipeline. In many instances, the N predetermined test binaries 205 also include tests to cover elements in the branch predictor, instruction fetch unit, decoder, op-cache, scheduler, execution unit, load/store unit and L1 cache of the processor 602.

In many implementations, the one or more of the N predetermined test binaries 205 test a number of features including: memory resource sharing among many threads using common operating system mutex constructs; monitoring/mwait scenarios across a large number of threads implemented both randomly and in the classic producer/consumer model; micro-op queue loop buffering; fencing of non-temporal loads/stores; branch predictor aliasing both through code reinterpretation and code shifting; code/data virtual aliasing; opcache fetch moding; deep execution-scheduler (ExSc) dependency chains to discourage speculation; low ExSc dependency conditions to encourage speculation; spec-lock-map conditions and spec-lock-map aborts; heavy branch prediction and heavy mis-prediction; store-to-load interlocks and store-to-load forwarding conditions; D-side table walk storms with aligned/misaligned crossers; cache and bus locking; heavy competition for few cache lines shared by many threads crossed with locks and capacity evictions; and other like conditions.

FIG. 3 is a flow diagram of an embodiment of the random runtime execution process 300 that is executed by each of the M physical threads in accordance with certain implementations. The manner in which the random runtime execution process 300 operates is defined by a control data structure 410 that exists for each of the N test types. The control data structure 410 is generated for each of the N predetermined test binaries 205.

The following code snippet shows an example of the control data structure 410:

control data structure declaration
struct tes_t list {
int array_size;
int timeout;
int data_parms;
int test_sampling;
int data_malloc_size;
void (*meminit)(unsigned int *,int);
funcptr *test_arr;
funcptr *test_end_arr;
int code_parms;
int exec_flags;
};
// Example of the structure definition for test type 20.
(semaphore ping-pong test)
{NUM_TYPE20_TESTS,
40,
SHARED+RESTORE+DATA_ALIAS,
SAMPL_FEW,
0x20000,
&meminitRand96k,
predetermined_test_type20,
predetermined_test_type20 end,
ALT+ALIAS+RELOAD+SHIFT,
MUTE}, The control data structure 410 specifies how to select individual subtests from within each of the predetermined test binaries 205 (step 310). For example, in certain implementations the control data structure 410 specifies a sample with replacement policy for picking subtests from their pool. Alternatively, in other implementations the control data structure 410 specifies a sample with no replacement policy for picking subtests. In other alternatives, the control data structure 410 specifies that the individual subtests are selected by creating a small temporary pool of arbitrarily chosen subtests and then randomly pick from this pool to allocate subtests to threads. This results in replication of subtests across multiple physical threads. The control data structure 410 in some embodiments also specifies to populate all logical and physical threads with the same subtest.

In many implementations, the control data structure 410 also defines the address space that is utilized when the test binary executes (step 320). For example, in certain implementations the control data structure 410 specifies an alternate data address space that is the virtual alias of the default data space. Alternatively, in other implementations, the control data structure 410 specifies an alternate subtest address that is the virtual alias of the subtest in the test binary.

The control data structure 410, in many implementations, defines how paging is handled for the test binary (step 330). For example, in certain implementations, the control data structure 410 requires that the default paging mode (e.g., 4 kB, 2 MB, 1 GB, etc.) be used throughout the execution of subtests in this test binary. In addition, for many implementations the control data structure 410 also specifies that an alternate paging mode be randomly switched to between subtest iterations.

The selected sub test is then run (step 340). In some implementations, all subtests are synchronized so that they begin execution simultaneously. This provides the maximum opportunity for the tests to interact with one another. For example, in certain implementations subtests complete at different times but each new iteration launches or re-launches them simultaneously. In certain implementations, the control data structure 410 includes a CODE WRITABLE value. The CODE WRITABLE value sets writable code permission from the Operating System (OS) for Self Modifying Code (SMC)/Cross Modifying Code (CMC) tests. Subtest code can also be reloaded with a RELOAD command to restore a test to its original state after a self-modifying test. In addition, the control data structure 410 in many implementations includes a SHARED MEM value. The SHARED MEM value specifies that a single data space is shared by all subtests for a given test type. In some cases, the control data structure 410 also includes a cyclic redundancy check (CRC) flag. The CRC flag specifies that a CRC of the data image is performed after each subtest iteration.

The control data structure 410 in many instances also defines how the data space is configured during each subtests execution (step 350). For example, in certain implementations, the data control file includes the value RESTORE DATA which directs the thread management function to restore the data space to its original contents between each iteration of the subtest. The restore data value is used for situations where a deterministic data image is expected after each iteration. Alternatively, in other implementations the control data structure 410 includes the value RE-RAND DATA which causes a randomization of the shared data space between subtest iterations. This value is utilized to cause continuous variation of Arithmetic Logic Unit (ALU) behavior, address sequences and code flow paths within the processor 602.

In many instances, the control data structure 410 also establishes how the physical subtest code is stored and executed for subsequent iterations (step 360). For example, in many implementations the control data structure 410 includes the value SHIFT PHYS CODE. The SHIFT PHYS CODE value causes a shift of the physical subtest code around by a variable (small) number of bytes between subtest iterations. The SHIFT PHYS CODE is often used to test the branch predictor. There are also switches in the control data structure such as DATA_ALIAS and CODE_ALIAS that act to randomly switch the virtual addresses at which a subtest accesses its code and/or data between each iteration. Since the code and data occupy a constant physical space, these addresses are virtual aliases that are chosen and allocated by the executive. Dynamic shifting of virtual address spaces adds stress to microarchitectural structures that are indexed/tagged by virtual address (i.e., caches, Translation lookaside buffers (TLBs), Branch Target Buffer (BTBs), and the like).

In many instances, a time out is also included in the control data structure 410. The TIMEOUT value sets the number of seconds of runtime for a given test type. For example, a new set of subtests is picked every 10 s. Therefore, if the timeout has not expired (step 370), process 300 is repeated. If the timeout has expired, an error is detected in the thread (step 380).

FIG. 4 graphically depicts the relationship between the individual test binaries 205 that are linked to form the test library 405 and their respective control data structure 410 in accordance with certain implementations. Specifically, FIG. 4 shows that each predetermined test binary 205 has an associated control data structure 410.

FIGS. 5A and 5B show portions of an example template 505 for template 500 in accordance with certain implementations. The template file 500 describes the structure and probabilistic rules for a particular test type. Specifically, the template file 500 further includes instructions for macro usage and their respective frequencies. In many instances, the template 500 also includes rules for addressing behavior (limits, striding, high and low frequency targets) of the operations. In certain embodiments, the template 500 specifies or limits the register usage. Further, the template file 500 in many implementations also specifies rules for branch behavior (prediction, taken/not-taken, forward/reverse, target distance) and looping constructs (size and iteration ranges). In addition, the template file 500 allows for the generation of recursive code blocks and public and private instruction links. In many cases, the template file 500 also specifies rules for thread-to-thread communication.

For example, in certain implementations the template file 500 is designed to utilize a variety of arithmetic logic unit (ALU) operations, as loads and load-op-stores that are all sequentially dependent so that younger ops may not be speculatively issued and executed prior to older ops. This causes the scheduler queue to backup very quickly and force dispatch stalls. Both high and low degrees of speculation are micro-architectural boundary conditions for the execution unit's scheduler. As such, they are 'red flag' scenarios that may require focus and stress. This type of test provides a very realistic example of the problems faced by microprocessor 602 design verification engineers.

The template file 500 contains three types of blocks. Each of these blocks functions are similar to 'class' structures as used in any object oriented language like C++ or Ruby. Like 'class' structures, the blocks each have their own methods and instance variables and are instantiated by a start/end block. Just like in other object programing languages, the object is given a name. These names act as a key into a hash-table of all of the instantiated objects in the weights file. Specifically, the weight file contains ops, immediates and tokens.

OPS blocks 510 designate a block of instructions. Each entry in an OPS block 510 is usually the name and input parameters for an instruction macro. The first parameter (an integer) is the relative weighting factor for that particular op. It is only significant when ops are being randomly selected from the list in that block. Randomization occurs if the following keyword is 'rand' followed by three numeric parameters that define how many ops in total that are picked from the block. If the keyword following the name is "sequential", it means that the weighting parameters are ignored, and each op in that block is chosen and placed into the test file in the order it appears. This enables the template file 500 to include inline code snippets or subroutines.

In the OPS block 510, the second parameter (e.g., ADD_REG_MEMm) is the name of an instruction macro, and all subsequent elements on that line are input parameters to that macro. Each one of the macro parameters is either a literal (preceded by the $ sign) or a key into the hash table of objects, in other words, the name of one of the other blocks in the weights file. For example, as shown in FIG. 5A, the relative weighting factor (1, 2, 3 etc.) is then followed by the name of the instruction macro (e.g., ADD_REG_MEMm) and is then subsequently followed by a list of names ('link_reg16', 'base', 'disp', 'lock' etc.) In addition, each one of these has its own block in the weights file. The macros are all defined in a text header file. This header file is read in by the parser, and its contents are pre-pended to the start of the source code for each subtest that the parser generates. These macro definitions in the source file allow the compiler/assembler to expand each macro instance into one or more assembly language instructions. There is only one reserved key name in the whole process, and that is 'main' used to denote the OPS Blocks 510 where test execution begins.

The OPS block also supports a special 'instruction' within the ops class which is called a SECTION. This special op SECTION is used as if it were a recursive call to another OPS Block 510. For example, when 'main' is sequentially executed and the SECTION command is encountered, it directs the parser to begin processing the ops in test_body. In this circumstance, these ops are no longer picked sequentially. SECTION is recursive in the sense that SECTIONS can exist within SECTIONS within SECTIONS. This provides the ability to embed different mixes of ops within a test and even nest unique sections within one another. This particular recursive structure is well suited to test for the micro-op queue loop buffer.

The template file 500 also contains token blocks 520. A token is an alpha-numeric string with an associated relative weighting factor. Token blocks 520 define groups of registers, operand size overrides, and other prefixes. For example, unevenly biasing the selection of an index register can be used to focus load/store activity in a particular address region. Controlling the sets of source and destination registers used by different types of instructions can enhance or diminish their inter-dependency.

For example, FIGS. 5A and 5B show a template file 505 for a dependency test. In this example, the index register and the destination register are limited to be 16 or 64 bit sizes of RAX. In addition, an operation CMPXCHG that implicitly uses RAX as both a source and a destination is utilized. Thus, every op's destination is also a source operand for the next younger op creating the serializing dependency chain.

In many implementations, the token blocks 520 also includes a lock token 530. This lock token 530 specifies the weighting factor for the X86 LOCK prefix which is used to force atomic (locked) behavior for a load-op-store operation. Locking prevents any other transactions in the machine from touching that particular memory location (cache line) during the read/modify/write process. Locked operations stress a difficult coherency feature of the machine and are therefore critical to test. For example, FIG. 5B shows 9 load-op-stores with the LOCK prefix attached.

The template file 500 also contains immediate blocks 540. Immediate blocks 540 are integers that are randomly generated via the following syntax used for each line in an immediate block. The syntax includes a weight, start, end, stepsize, and_mask, and or_mask values. The weight value sets the relative weight of this particular formula within the immediates block relative to other weighted elements in the block. For example, if there are three elements in a block and the first has a weight of 1, the second has a weight of 3 and the third has a weight of 4; this means their probabilities of being picked are as follows: The first has a 1/8 probability, the second has a 3/8 chance, and the last one has a 4/8 chance.

The start value sets the starting (numerically lowest) integer value in a range from which to randomly pick a value. The end value sets the ending (numerically greatest) integer value in the range. The step size value sets the size of the stride at which to make random picks. For example, to pick random 64-byte cache-line aligned values in the range 0→0xFFF to use for a displacement field in some addressing scheme, a start value of 0, an end value of 0x1000 and a step size of 0x40 are used. Calls to the rand( ) method for this immediate object would return random integers in the set {0, 0x40, 0x80, 0xc0 . . . 0xFC0}.

The and_mask value is a bit mask that is applied (bitwise AND) to the number calculated using start, end and stepsize. For example, a certain implementation the and_Mask is used to force L1 data cache capacity evictions by restricting addressing to a single specific linear index (address bits 11:6) such that random variations in address bits 48:12 quickly fill up all eight ways at that index and force an eviction. In addition, to create a 32-bit address that always targets linear index 0 of the L1 data cahce (DC) with no other guarantee of alignment within the cache line, an and_mask of 0xFFFFF03F are utilized. Further, to target linear index 0 and also force DWORD (4 byte) alignment, then a mask of 0xFFFFF03C are utilized.

The or_mask value is a bit mask applied (bitwise OR) to the number calculated using start end, stepsize and and_mask. For example, to generate random numbers that would always create 4 kb page-misaligned addresses for quadword (8 byte) accesses, an or_mask of 0xFF9 are utilized.

In certain implementations, the random runtime execution process 300 is firmware based and requires no operating system, video, keyboard or hard drive. In these implementations, the random runtime execution process 300 is automatically invoked immediately upon reset and is loaded from BIOS ROM into main memory executing without human intervention. For example, previously OS-provided services such as memory, thread and paging management as well as exception handling, can be tested without modification or re-compilation may not be available to the runtime executive routine. In these implementations, the runtime executive may need to supply its own services for memory, thread and page management as well as exception handling, but the subtest binaries themselves do not require modification. These implementations allow processors that may have bugs that are severe enough to prevent the computer from booting an operating system to be debugged. As a result, all that is needed to debug the processor 602 is a ROM to hold the executable and memory into which it can be loaded and executed. These implementations are also well suited for debugging GPUs.

FIG. 6 is a block diagram of an example device 600 in which the processor 602 is redesigned using processor redesign process 100. The device 600 includes, for example, a server, a computer, a gaming device, a handheld device, a set-top box, a television, a mobile phone, or a tablet computer. The device 600 includes the processor 602, a memory 604, a storage 606, one or more input devices 608, and one or more output devices 610. The device 600 also optionally includes an input driver 612 and an output driver 614. It is understood that the device 600 includes additional components not shown in FIG. 6.

The processor 602 may include a central processing unit (CPU), a graphics processing unit (GPU), a CPU and GPU located on the same die, or one or more processor 602 cores, wherein each processor 602 core may be a CPU or a GPU. The memory 604 is located on the same die as the compute node or processor 602, or is located separately from the compute node or processor 602. In an implementation, the memory 604 includes a volatile or non-volatile memory, for example, random access memory (RAM), dynamic RAM, or a cache.

The storage 606 includes a fixed or removable storage, for example, a hard disk drive, a solid state drive, an optical disk, or a flash drive. The input devices 608 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 610 include a display, a speaker, a printer, a haptic feedback device, one or more lights, an antenna, or a network connection (e.g., a wireless local area network card for transmission and/or reception of wireless IEEE 802 signals).

The input driver 612 communicates with the compute node or processor 602 and the input devices 608, and permits the compute node or processor 602 to receive input from the input devices 608. The output driver 614 communicates with the compute node or processor 602 and the output devices 610, and permits the processor 602 to send output to the output devices 610. It is noted that the input driver 612 and the output driver 614 are optional components, and that the device 600 operates in the same manner if the input driver 612 and the output driver 614 are not present.

It should be understood that many variations are possible based on the disclosure herein. Although features and elements are described above in particular combinations, each feature or element may be used alone, without the other features and elements, or in various combinations with or without other features and elements.

The methods provided may be implemented in a general purpose computer, a processor 602, or a processor core. Examples of processor 602 include a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor 602. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of debugging a processor, the method comprising:
    receiving an input of a template file for each of a plurality of test types;
    for each particular test type from the plurality of test types:
        generating a first predetermined number of randomized subtests according to a respective template file of the particular test type, and
        compiling the first predetermined number of randomized subtests into a test binary for the particular test type;
    linking the test binary for each of plurality of test types to form a test library;
    randomly selecting a subset of test binaries from the test library;
    executing each of the selected subset of test binaries on a number of physical threads of the processor according to a control data structure for each test binary, wherein the executing includes randomly selecting particular randomized subtests from each test binary of the subset of test binaries and running each of the selected particular randomized subtests;
    detecting one or more errors in the executing; and
    redesigning the processor based on the one or more errors detected.

2. The method of claim 1, wherein the randomly selecting particular randomized subtests is performed using a sample with replacement policy.

3. The method of claim 1, wherein the randomly selecting particular randomized subtests is performed using a sample with no replacement policy.

4. The method of claim 1, wherein the randomly selecting particular randomized subtests is performed by creating a temporary pool of arbitrarily chosen subtests and then randomly picking from the temporary pool.

5. The method of claim 1, wherein the control data structure further specifies a paging mode for running the selected particular randomized subtests, and
    the running is performed according to the paging mode.

6. The method of claim 5, wherein the paging mode is a default paging mode that is used throughout each test binary.

7. The method of claim 5, wherein the paging mode is randomly switched after each of the particular randomized subtests is run.

8. The method of claim 1, wherein the executing further includes randomly shifting physical code of the particular randomized subtests around by a variable number of bytes after each of the particular randomized subtests is run.

9. The method of claim 1 wherein the control data structure specifies a timeout for the executing, and the method further comprises:
    randomly selecting a new subset of test binaries from the test library after the timeout has expired.

10. The method of claim 1, wherein the respective template file of the particular test type includes a weighting file that specifies relative frequencies for operations within the template; and
    the first predetermined number of randomized subtests are generated based on the relative frequencies.

11. The method of claim 1, wherein the respective template file of the particular test type includes a weighting file that specifies size and iteration range for loops within the template; and
    the first predetermined number of randomized subtests are generated based on the size and iteration range for the loops.

12. The method of claim 1, wherein the respective template file of the particular test type includes a weighting file that specifies recursive code blocks within the template; and
    the first predetermined number of randomized subtests are generated based on the recursive code blocks.

13. The method of claim 1, wherein the respective template file of the particular test type includes a weighting file that specifies register usage within the template; and
    the first predetermined number of randomized subtests are generated based on the register usage.

14. The method of claim 1, wherein the respective template file of the particular test type includes a weighting file that specifies a branch prediction behavior within the template; and
    the first predetermined number of randomized subtests are generated based on the branch prediction behavior.

15. The method of claim 1, wherein a dataspace of the processor is randomized prior to the executing.

16. The method of claim 15, wherein the control data structure further specifies a data address space of the dataspace for the running of each of the selected particular randomized subtests, and
    the running of each of the selected particular randomized subtests is performed within the data address space.

17. The method of claim 16, wherein the data address space is a virtual alias of the dataspace.

18. The method of claim 15, wherein the executing further includes restoring the dataspace to its original contents after each of the particular randomized subtests is run.

19. The method of claim 15, wherein the executing further includes re-randomizing the dataspace after each of the particular randomized subtests is run.

20. The method of claim 15, wherein the detecting the one or more errors in the executing includes performing a cyclic redundancy check on the dataspace.

* * * * *